(No Model.)  2 Sheets—Sheet 1.
G. H. HOLLISTER.
CAR COUPLING.
No. 255,987. Patented Apr. 4, 1882.
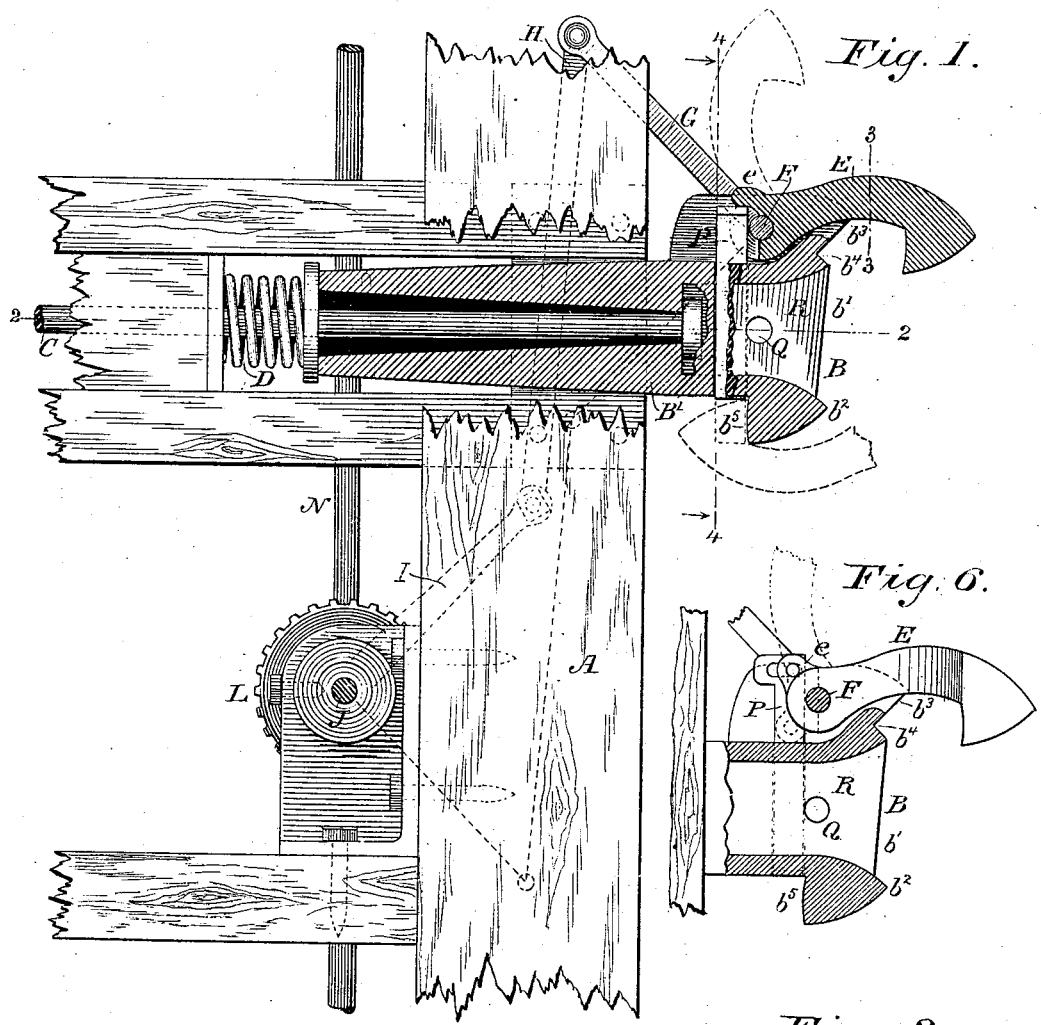
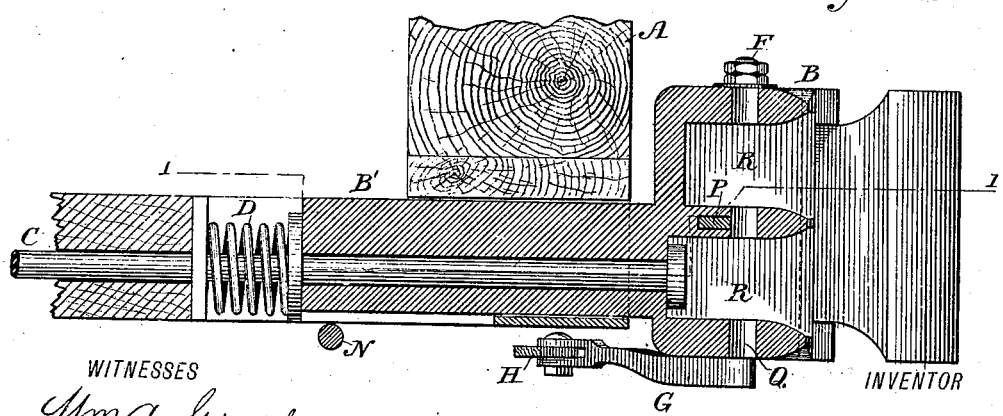
WITNESSES
Wm A. Skinkle
Geo. W. Breck
INVENTOR
George H. Hollister (No Model.)  2 Sheets—Sheet 2.

G. H. HOLLISTER.
CAR COUPLING.

No. 255,987.  Patented Apr. 4, 1882.

WITNESSES
Wm. A. Skinkle
Geo. W. Breck

INVENTOR
George H. Hollister

UNITED STATES PATENT OFFICE.

GEORGE H. HOLLISTER, OF WASHINGTON, DISTRICT OF COLUMBIA.

CAR-COUPLING.

SPECIFICATION forming part of Letters Patent No. 255,987, dated April 4, 1882.

Application filed January 19, 1882. (No model.)

*To all whom it may concern:*

Be it known that I, GEORGE H. HOLLISTER, a citizen of the United States, residing in the city of Washington, District of Columbia, have invented certain new and useful Improvements in Car-Couplings, of which the following is a specification.

The object of my invention is to provide a car-coupling which may be operated in coupling or uncoupling either from the platform or side of the car, so as to avoid all danger of personal injury to the operator, which will securely join the cars when coupled, which can, when desired, be coupled automatically, and which can be used in connection with couplings already in use with the ordinary bolt-and-link connections.

Figure 3:
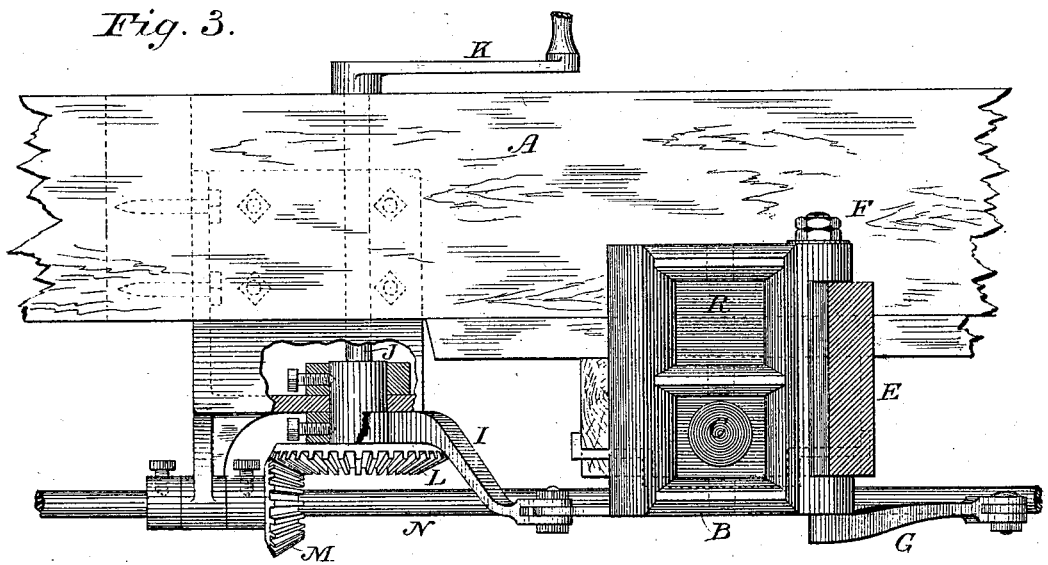
Figures 5, 7:
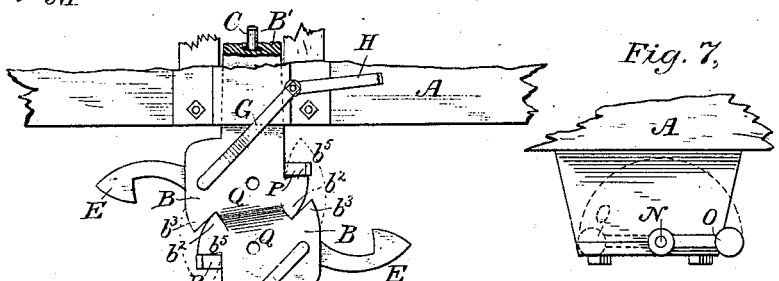
Figure 4:
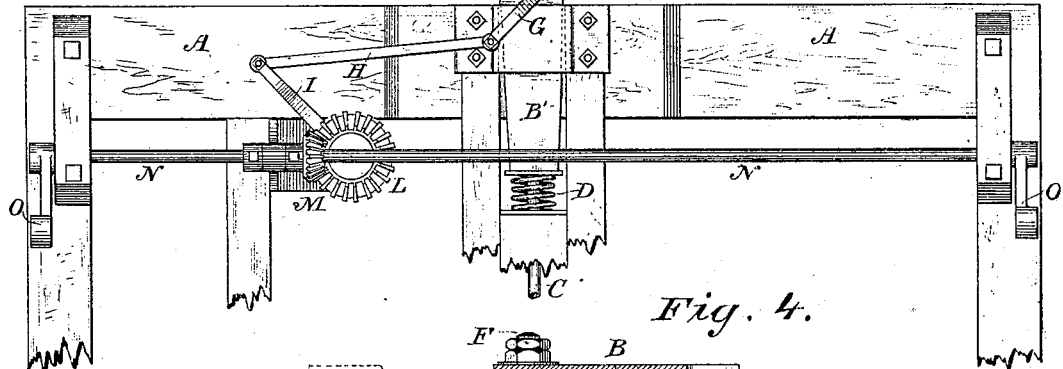

In the accompanying drawings, Figure 1 is a plan view, partly in section on line 1 1, Fig. 2, of my improved coupling and a portion of its operating mechanism. Fig. 2 is a vertical section of the same on line 2 2, Fig. 1. Fig. 3 is a front elevation of the coupling and a portion of its operating mechanism, showing the coupling-hook in section on the line 3 3, Fig. 1. Fig. 4 is a section of the coupling on the line 4 4, Fig. 1, looking in the direction of the arrows, the dotted line representing the coupling-hook as thrown back, as in dotted lines, upper portion of Fig. 1. Fig. 5 is a bottom view, representing two couplings on adjoining cars with the coupling-hooks thrown in such positions that they cannot automatically couple, the dotted lines indicating the coupling-hooks in coupled position. Fig. 6 shows a different construction for connecting the slide-bolt and coupling-hook from that shown in Figs. 1 and 4. Fig. 7 represents in full lines the weighted lever shown at the left side of Fig. 5 in the position which said lever will occupy when the hooks are uncoupled, as shown in said figure, and in dotted lines the position which said lever will occupy when the hooks are coupled.

Similar letters indicate corresponding parts in the several figures.

A represents a portion of the wood-work of a car to which my coupling is applied.

B is the draw-head, and B' the draw-bar.

C is the draw-rod, and D the buffer-spring, both being of the usual construction.

The face $b'$ of the draw-head B is formed transversely at an angle or slightly diagonal to the draw-bar B', for a purpose which will presently be shown.

Extending a little outward from face $b'$, on one side thereof, is a pointed projection, $b^2$, and on the other side of said face is a similar but somewhat larger projection, $b^3$, with a pointed or V-shaped recess between the face of $b'$ and the projection $b^3$.

On the rear side of the pointed projection $b^2$ is formed a shoulder, $b^5$, for the engagement of the coupling-hook of the opposite coupler. The coupling-hook E is rigidly secured to a bolt, F, adapted to turn in the draw-head B, and to said bolt is also rigidly secured an arm, G, connected by a link, H, with an arm, I, rigidly secured to a vertical shaft, J, journaled in the platform or other suitable part of the wood-work of the car, and provided with a crank, K, or other suitable device, such as a hand-wheel, whereby said shaft can readily be turned by the operator.

In applying my coupling to freight-cars the shaft J may be extended to the top of the car. It is obvious that the position of the shaft J may be changed somewhat; but the arms G and I should be of such length that the link H will occupy a position as nearly as possible at right angles to the draw-bar B', in order to insure the security of the coupling when the draw-bar is moved longitudinally against its spring.

To the vertical shaft J is secured a bevel-gear wheel, L, meshing with a bevel-gear wheel, M, on the horizontal shaft N, journaled in suitable bearings secured to the wood-work of the car. The gear-wheel M has preferably half the number of teeth of the gear-wheel L. To the outer ends of the shaft N are secured weighted arms O, in convenient position to be reached by an operator standing clear of the cars.

The draw-head B is provided with a transverse recess or slot just back of the shoulder $b^5$, to which slot is fitted a sliding bolt, P, which is so connected to a cam or projection, $e$, of the coupling-hook E that when said hook is thrown back by the arm G the sliding bolt P will be urged outward past the shoulder $b^5$, forcing the hook of the opposite coupling off from said shoulder, and thus causing one hook in its operation to positively uncouple the hook of the opposite coupling.

The head of the sliding bolt P may simply rest against the cam or projection $e$ of the hook E, as shown in Figs. 1 and 4, in which case, after having thrown off the hook of the opposite coupler, said sliding bolt P will be returned to its normal position by the said hook of the opposite coupler when it passes the shoulder $b^5$ in coupling; but I prefer to connect said sliding bolt and cam or projection together by a slot and pin, as shown in Fig. 6, or by a short link, which will be pivoted to the said bolt and to the cam or projection $e$.

The faces $b'$ of the draw-heads B being formed at an angle relatively to the draw-bar B', and said draw-heads being formed with the projections $b^2$ and $b^3$ and recess $b^4$, it is obvious that when two of said draw-heads are in juxtaposition, as shown in Fig. 5, the parts will so intermesh that when they are locked together by the coupling-hooks lateral movement of one upon the other will be impossible, and thus the coupling-hooks cannot become thrown out of position by the lateral swaying of the cars or the jarring and jolting incidental to the rapid movement of the trains.

To permit the coupled draw-heads to accommodate themselves to short curves independently of the cars themselves, the longitudinal holes or recesses in the draw-bars B', through which are inserted the draw-bolts C, are made flaring from front to rear—or, in other words, said holes or recesses are gradually enlarged from the heads of the draw-rods C to their points of exit from the draw-bars B', and the external sides of said draw-bars are preferably tapered from near the draw-head B to their rear ends, as clearly shown in Fig. 1, thus allowing the draw-rods to swivel easily within the said draw-bars to permit of limited movements of parts upon and within each other.

The draw-rod C is headed, and such head is arranged in or immediately in the rear of the draw-head, and extends thence through the entire length of the draw-bar. This construction is not original with me, but I utilize it in order to obtain a pivotal point near the point of application of strain; and in order to permit the vibration or movement of the cars just described, I extend the tapering recess from immediately back of the head of the bolt or rod to the rear of the draw-bar.

The weighted levers O, which are in convenient position to be reached by the operator from the outside of the car in coupling and uncoupling, and which are intended to be used as hand-levers, also serve to keep the coupling-hooks in coupled position, as indicated by dotted lines in Fig. 5, or to hold said hooks in uncoupled position, as shown in full lines in said figure.

When it is desired to couple the cars automatically the hooks will stand in their coupled position, and as the draw-heads come together the coupling-hooks will be forced slightly outward by their pointed projections $b^2$, and the weighted levers O will be slightly raised by the movements of the intermediate mechanism until the coupling-hooks pass the shoulders $b^5$, when the weighted levers O cause a return movement of the shaft N and other parts of the mechanism between said levers and the coupling-hooks, forcing the hooks inward into position back of the shoulders $b^5$ and securely holding them in their coupled position.

To allow my coupling to be used in connection with cars having the ordinary pin-and-link couplings, and to provide for such use with cars or couplings of varying heights, the draw-heads B are provided with pin-holes Q and with link-chambers R. When the link-and-pin couplings are to be used the coupling-hooks E will be thrown back, in which position the weighted levers O will hold them, as shown in Fig. 5.

Instead of the coupling-hooks E, which I have shown, it is obvious that pivoted bails, which are the well-known equivalents in this class of devices for the coupling-hooks, might be employed with the other mechanism shown; but the coupling-hooks are deemed to be preferable.

From the foregoing description it will be seen that my coupling may be operated by the crank or its equivalent, either from the platform or the top of the car or from the outside of the car, by the levers O; or cars having my coupling may be automatically coupled by first placing the coupling-hooks in proper position for such operation.

Having thus described my invention, what I claim as new, and desire to secure by Letters Patent, is—

1. In a car-coupling or draw-head, B, having a diagonal face, $b'$, a V-shaped recess, $b^4$, and pointed projections $b^2$ $b^3$, substantially as described and shown.

2. In a car-coupling, the combination, with a draw-head, B, having a diagonal face, a V-shaped recess, and pointed projections, as described, of a pivoted hook, E, as set forth.

3. The draw-head B, having the draw-bar B', provided with a recess extending its entire length and flaring from its front to its rear end, as shown and described, combined with the draw-rod C, having its head arranged in the draw-head as a pivotal point for said draw-bar and extending throughout the recessed draw-bar, substantially as specified.

4. In a car-coupling, the draw-head B, having a transverse recess or slot, combined with the coupling-hook E, having the cam or projection $e$, and the sliding bolt P, fitting in said transverse recess and adapted to be operated by said cam or projection e on the backward movement of the hook E, whereby the said bolt P will be positively thrown outward, and thereby disengage the hook of the opposite coupling, as set forth.

5. The combination, with the draw-head B, of the pivoted hook E, arm G, link H, arm I, shaft J, gear-wheels L and M, and shaft N, having levers O on its opposite ends, substantially as set forth.

GEORGE H. HOLLISTER.

Witnesses:
H. A. HALL,
J. J. SUTPHEN.